(12) United States Patent
Miller et al.

(10) Patent No.: US 12,517,089 B1
(45) Date of Patent: Jan. 6, 2026

(54) CHEMICAL LANTERNS AS MINIATURE SPECTROMETER DOPANT SOURCE

(71) Applicant: National Technology & Engineering Solutions of Sandia, LLC, Albuquerque, NM (US)

(72) Inventors: Philip Rocco Miller, Albuquerque, NM (US); Joshua J. Whiting, Albuquerque, NM (US); Matthew W. Moorman, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 489 days.

(21) Appl. No.: 18/142,281

(22) Filed: May 2, 2023

(51) Int. Cl.
    *G01N 27/622*      (2021.01)
    *G01N 27/64*      (2006.01)

(52) U.S. Cl.
    CPC ........... *G01N 27/622* (2013.01); *G01N 27/64* (2013.01)

(58) Field of Classification Search
    CPC .............................. G01N 27/622; G01N 27/64
    USPC .............................. 250/281, 282, 288, 493.1
    See application file for complete search history.

(56) References Cited

U.S. PATENT DOCUMENTS 6,347,936 B1 *    2/2002    Young ...................... F23D 3/02
                                                                                                               126/45

\* cited by examiner

*Primary Examiner* — Michael Maskell
(74) *Attorney, Agent, or Firm* — Samantha Updegraff; Eschweiler & Potashnik, LLC

(57) ABSTRACT

Ion mobility spectrometers are uniquely sensitive chemical detectors used in a variety of application spaces. Chemical dopants are commonly used with these instruments to improve sensitive and selectivity of detected species. A dopant source with a wicking filament approach to control emission of a chemical dopant in a small format is disclosed herein. This is demonstrated for several dopants used with IMS detectors and initial performance parameters (e.g., emission rate, emission lifetime, emission concentration control) have been investigated. The dopant source can be used in other chemical ionization systems.

20 Claims, 4 Drawing Sheets

CHEMICAL LANTERNS AS MINIATURE SPECTROMETER DOPANT SOURCE

GOVERNMENT RIGHTS

This invention was made with Government support under Contract No. DE-NA0003525 awarded by the United States Department of Energy/National Nuclear Security Administration. The U.S. Government has certain rights in the invention.

FIELD

This disclosure relates to materials and configurations of dopant sources for chemical ionization spectrometry. In particular it relates miniaturizing and mobilization of ion mobility spectrometers.

BACKGROUND

Chemical dopants are used with chemical ionization spectrometers, such as ion mobility spectrometers, to improve sensor sensitivity and selectivity. Chemical ionization spectrometers work by ionizing a sample compound, and the discharge of that energy provides a signal with information about the sample that can be read by a detector.

A dopant improves the spectrometer's capability because it can enhance the chemistries that can be detected and/or improve the sensitivity of the device, because it provides a more efficient process. The ionization source can be UV photons or alpha particles. The dopant can be selected to have a threshold of ionization potential so that it blocks or preferentially reacts with other compounds except for the target analyte. This enables the device to eliminate noise or other compounds that are not being looked for. Dopants also can be used to ionize target analyte compounds that resist ionization For instance, with a UV ionization source, there is an energy threshold and for analytes there is insufficient energy to cause the ionization. A dopant that is easily ionized can be used to facilitate the charge transfer. It is a challenge to release the dopant at a consistent rate over time.

Current dopant sources used in chemical ionization systems utilize a sealed tube that is configured to release dopant through the seal. However, this type of device suffers from lack of a consistent dispersion rate through the seal. Other dopant sources for non-mobile devices utilize a diffusion tube, which is simply an open tube with a chemical dopant that has volatility at atmospheric pressure. However, such devices are not conducive to easily moving from location-to-location for use in the field. Such devices are also not conducive to miniaturization.

It would be desirable to create a miniature chemical ionization system for use in various field deployable applications. Miniaturizing complementary components while reducing consumables is also desirable.

In some aspects, the techniques described herein relate to a device for dispersing a chemical dopant for chemical ionization, including: a vial containing a chemical dopant; and at least one wick with a first end extending outside the vial and a second end extending to contact the chemical dopant.

In some aspects, the techniques described herein relate to a chemical ionization system including: an ionization source; and a dopant source, the dopant source including: a vial; and at least one wick with a first end extending into the vial and a second end extending outside the vial.

In some aspects, the techniques described herein relate to a method for doping a chemical ionization system, the method including: inserting a liquid dopant into a vial; diffusing the dopant into a ionization region of the system through at least one wick with a first end extending into the vial and a second end extending outside the vial; doping a sample with the dopant.

SUMMARY

A different solution for releasing dopant into a spectrometer is disclosed herein. Instead of relying on diffusion through a membrane or other material, the technology disclosed herein utilizes absorption and transmission through a wick to consistently distribute a dopant to a chemical ionization spectrometer system.

In some aspects, the techniques described herein relate to a device for dispersing a chemical dopant for chemical ionization, including: a vial containing a chemical dopant; and at least one wick with a first end extending outside the vial and a second end extending to contact the chemical dopant.

In some aspects, the techniques described herein relate to a chemical ionization system including: an ionization source; and a dopant source, the dopant source including: a vial; and at least one wick with a first end extending into the vial and a second end extending outside the vial.

In some aspects, the techniques described herein relate to a method for doping a chemical ionization system, the method including: inserting a liquid dopant into a vial; diffusing the dopant into a ionization region of the system through at least one wick with a first end extending into the vial and a second end extending outside the vial; and doping a sample with the dopant.

DETAILED DESCRIPTION

Various technologies pertaining to scintillator materials are described herein. In the following description, for purposes of explanation, numerous specific details are set forth in order to provide a thorough understanding of one or more aspects. It may be evident, however, that such aspect(s) may be practiced without these specific details. Except when the context clearly indicates the contrary, the term "polymer" is meant to also encompass copolymers.

The technology disclosed herein provides a way to miniaturize an IMS dopant source using a lantern wick construction, in which a thread connects the inside of a glass vial filled with the dopant chemicals with the external environment through a septum. This concept was demonstrated to emit various chemistries in a controlled and repeatable manner.

Initial experiments demonstrated a consistent reaction ion peak (RIP) throughout the duration of a gas chromatography run, a standard chemical analysis. Achieving consistent RIPs during these runs are valuable since the RIP facilitates charge transfer to target chemistries and can enable quantification of those targets. Six different dopant chemistries were tested with the lantern construction and were chosen based on traditional positive and negative mode ion mobility spectrometry (IMS) systems.

Figure 1:
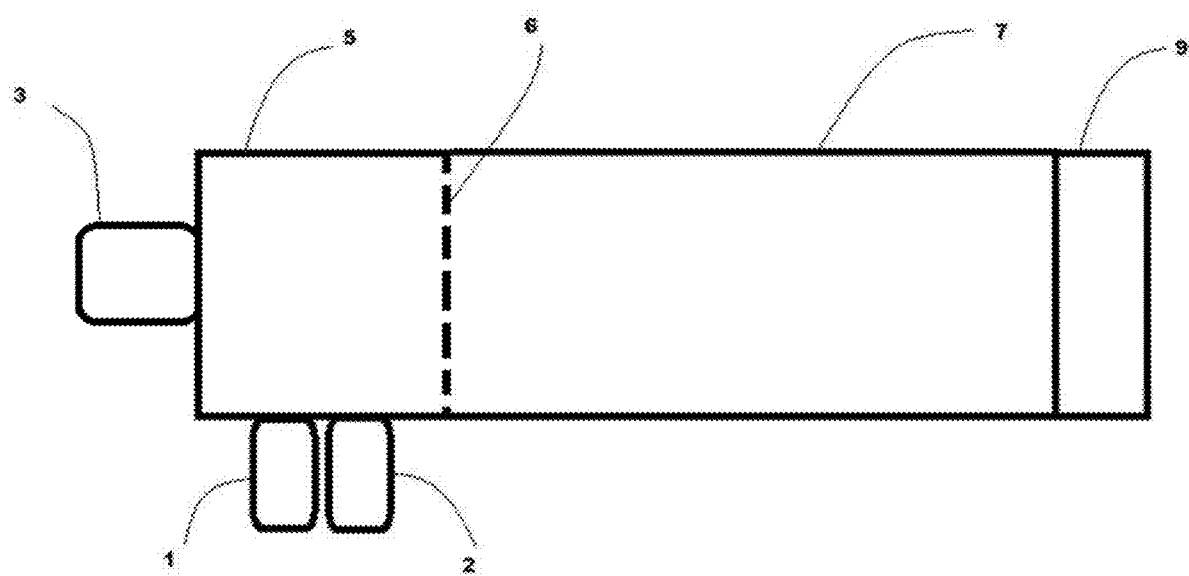
FIG. 1 is diagram of an exemplary IMS system.

IMS systems detect and analyze ions based on their mobility in a gas phase. Components of an IMS system are described below and some of which are shown in FIG. 1, which is a simplified diagram of an IMS system. It should be noted that other configurations of IMS systems are known by those of ordinary skill in the art and may differ from that disclosed in FIG. 1.

A sample source 1 and a dopant source 2 are coupled to an ionization region 5. An ionization source 3, which generates ions from the sample source 1 and dopant source 2, is at one end of the IMS system and exerts its ionizing influence into the ionization region 5. Common ionization sources include radioactive materials, such $Ni^{63}$, corona discharge, and photoionization. In other embodiments, the sample source 1 and/or dopant source 2 may flow through an ionization region 5 surrounded by the ionization source 3.

A drift tube 7, which is coupled to the ionization region 5 via an ion gate 6 separator, is usually the largest component of an IMS system. The drift tube 7 functions to separate the generated ions based on their mobility. It is typically a long, narrow tube filled with a buffer gas such as helium or nitrogen.

A detector 9 is used to detect ions that have passed through the drift tube 7. Common types of detectors 9 include Faraday plates and microchannel plates. In certain embodiments, a gas handling system is used to supply the buffer gas to the drift tube and to control the flow of gas through the system, it may also be used to maintain a low-pressure environment in the drift tube 7. Atmospheric pressure can also be used in some systems. Supporting electronics are used to control the instrument and process the data collected by the detector. This includes high-voltage power supplies, amplifiers, and analog-to-digital converters. Software is also used to analyze the data collected by the detector and to interpret the results of the IMS system measurement.

While not always required in an IMS system, a dopant source in a chemical ionization spectrometer functions to enhance the detection and differentiation of target analytes. Dopant chemicals may be added to the carrier gas to create a mixture that interacts with the analyte molecules and alters their ionization properties. The dopant molecule is also ionized by the ionization source and attaches to either the desired analyte molecule or a molecule that is desired to be excluded from analysis. The chemical dopant can enhance the ionization efficiency of the system, and/or produce higher sensitivity and selectivity in the IMS detection process.

The choice of dopant depends on the specific application and the analyte desired for detection or exclusion. The dopant concentration and flow rate should be consistent to achieve the desired effect without interfering with the functions of the system.

In an embodiment, chemicals used as the dopant in the vial can be selected from a volatile organic compound that interacts with either a desired analyte or contaminant that is desired to be excluded from the analysis. Example dopants include methanol, isopropanol, acetone, acetonitrile, toluene, trichloroethanol, dichloromethane, dimethylformamide (DMF), dimethyl sulfoxide (DMSO), tetrahydrofuran (THF), ethanol, tricholoroethanol, methyl salicylate, water, and ethyl acetate. Dopant chemistries tested with the dopant source disclosed herein were: toluene, tricholoroethanol, methyl salicylate, water, isopropanol, and acetone.

Care should be taken to select a wick material and septum material that is compatible with the dopant chemistry. Epoxies or glue, whether ceramic-based or butyl, should also be chosen to be compatible with the dopant. The solubility and swellability of the adhesive in the dopant is another factor to consider for compatibility with the dopant. In an embodiment, the vapor pressure of the dopant is at or exceeds that of water at 25° C., that is, 3.16 kPa by the simple formula (I):

$$P_{simple} = e^{20.386 - T + 2735132}$$  (I)

In an embodiment, the vapor pressure of the dopant at 25° C. may range from 0.0005 to 50 kPa, such as for example, 0.5 to 30 kPa, or 3 to 10 kPa.

Figure 2:
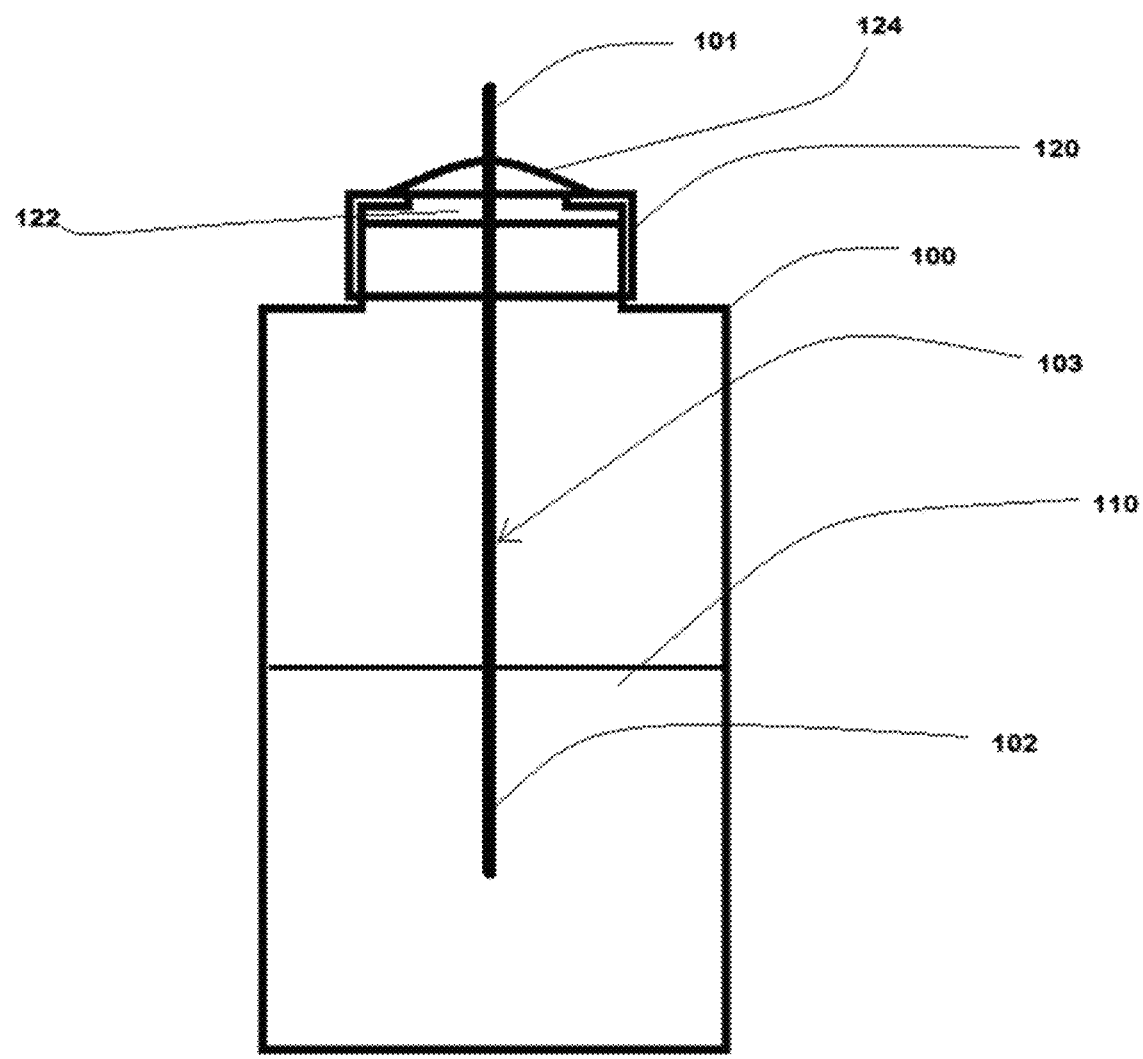
FIG. 2 is a cross-sectional view of an exemplary embodiment of the dopant source for use in an IMS system.

FIG. 2 discloses an exemplary dopant source for an IMS system. A chemical dopant 110 is disposed in a vial 100. The vial 100 may be made of glass or another material that is inert to the dopant 110. The vial 100 is open at the top, but is covered by a cap 120, which may be made of a metal, such as aluminum. The cap 120 also has an opening at its top center. The top center opening in the cap is covered by a septum 122. The septum 122 is made of an inert material such as silicone rubber. The septum 122 is covered by a layer of sealant 124 that extends at least over the interface where the wick 103 extends through the septum 122.

The wick 103 has a first end 101 extending outside the vial 100 and a second end 102 extending to contact the dopant 110. The wick functions to absorb the dopant 110 and transport the dopant to the outside of the vial 100. The dopant 110 travels up through capillaries formed in the textile fibers of the wick 103 and is released at the first end 101. The rate of release of the volatile dopant 110 was found to be highly consistent over time. The orientation of the wick 103 was also found to have no effect on the release rate, so long as the second end 102 is contacting the dopant 110. A flexible textile wick 103 is desirable so that it will be pulled and moved by gravity in the same direction that the dopant 110 is pulled, so that even if the vial 100 is tipped over on its side, the dopant source is still operable and the rate of release should stay constant. In fact, even if the vial 100 is turned upside down, the rate of release should stay constant.

The vial 100 can be of various sizes, but where miniaturization of devices is desired, the vial may be, for example, 5 to 50 mm in its longest dimension, such as height, for example the dimension may be 10 to 35 mm, or 15 to 25 mm. In miniaturized embodiments, total volumes for the exterior of the vial may range from 1 to 15 cm$^3$, 3 to 12 cm$^3$, or 5 to 10 cm$^3$; and total volumes for the dopant liquid itself may be, for example, 0.5 to 12 cm$^3$, 1 to 10 cm$^3$, or 3 to 8 cm$^3$.

The sealant and septum material should be selected to be inert to the dopant 110. Unlike a lantern used for combustion, an air-tight seal is particularly desirable not only to prevent spillage into the system, but also so that vapor pressure inside the vial 100 is higher than the pressure outside the vial 100. This pressure differential promotes the capillary action to the first end 101 of the wick 103 in the absence of combustion. Thus, deterioration of the seal can be highly detrimental to the consistent release rate of the dopant 110.

The Examples below showed that the wick provides a very constant emission rate. The emission rate also is affected by the concentration/vapor pressure in the headspace of the vial.

The sealant can be chosen for a low gas permeability property and resistance to deterioration from the dopant liquid. Example sealants include: one-part or two-part epoxy adhesives, such as for example: bisphenol A type epoxy resin, epoxy acrylate resin, vinyl ester, radiation cured epoxy acrylate resin, or epoxy novolac resin. Other sealants can also be used, such as for example, silicone or fluoropolymers, such as polytetrafluoroethylene (PTFE).

In an embodiment, the wick 103 is a flexible material capable of conducting the dopant 110 to the first end 101 extending outside the vial 100. The wick 103 should also be inert to the dopant 110. The wick material may be a textile such as, for example, polyester, cotton, fiberglass, Kevlar, silk, linen, jute, or sisal can be used. Natural materials such as wood (including paper) could also be used if capillary action is sufficient. Polymeric materials (which include copolymers) can also be used for the wick. The wick 103 may have, for example, a diameter of 0.10 to 1 inch, such as, 0.25 to 0.75 inches, or 0.333 to 0.667 inches. A round, square, or flat wick cross-sectional shape can be used.

The emission rate of the dopant can be controlled by using multiple wicks, such as 2 to 50, 3 to 20, or 4 to 10. The material and diameter of the wick can also be used to change the rate of release. The multiple wicks can extend through a single puncture in the septum or each wick can extend through its own puncture.

The dopant source can be assembled by inserting the dopant 110 in the open vial 100, then adding cap 120 with the septum 122 attached to it. The cap 120 can be secured by crimping the edges around the neck of the vial 100 in a bottle-capping type of process. It was determined that twisting after crimping improved the seal. After this, the septum 122 is punctured (e.g., with a sharp instrument), one or more wicks 103 are inserted, and a sealant 124 is extruded or otherwise laid over the puncture, fully covering it.

Other methods of assembly could be used. For example, a screw on cap could be used instead of a crimp on process. In another example, the vial 100 and cap 120 could be assembled and the dopant 110 could be injected through a needle puncturing the septum 122 and a wick could be inserted in the same hole, then overlaid with sealant 124. The process of assembly could also be scaled up for factory production in various ways.

Figure 6:
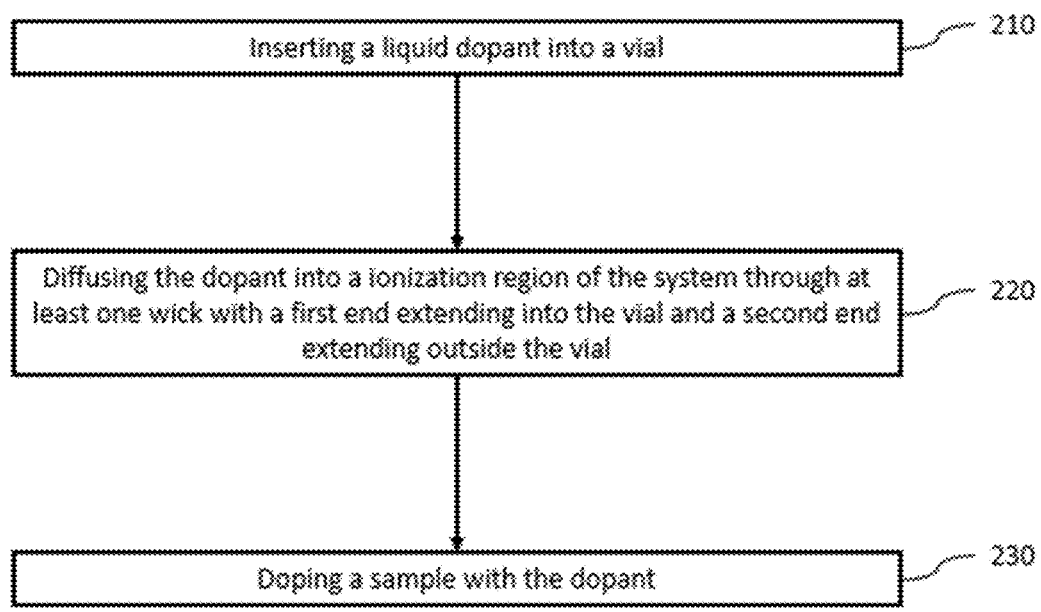
FIG. 6 is a flowchart of an example method for doping a chemical ionization system.

FIG. 6 is a flowchart of an example method for doping a chemical ionization system. At step 210, the liquid dopant is inserted into a vial, for example, by either pouring or injection. At step 220, the dopant is diffused into an ionization region of the system. This is performed through at least one wick with a first end extending into the vial and a second end extending outside the vial. At step 230, a sample analyte is doped with the dopant, that is, it reacts with or otherwise modifies a sample. This can be done to block unwanted portions of the sample from analysis or detection, or it can be done to enhance the ionizability of the desired analyte, as discussed above.

The dopant source as configured as disclosed herein has a highly consistent rate of release, i.e., a linear emission profile, for example, with an R squared value of at least 0.95, such as 0.96 to 0.9999, or 0.98 to 0.99, or 0.985 to 0.995. In an embodiment, the overall rate of release may be in a range of 1 to 20 μL/day, such as 2 to 15 μL/day, or 3 to 10 μL/day, whether the vial is upright or on its side.

The mobile spectrometers disclosed herein and enabled by the dopant wicking device may be used for isotope identification in applications that require high detection efficiency (large-volume). Specific examples of applications of the technology disclosed herein are for detection of illegal drugs, prescription drugs (such as fentanyl or other opioids), and chemical warfare agents. The dopant source could also be used for detection of other volatile organic compounds (VOCs). The mobility of devices for detection of particles in the air in other fields can also be enabled and improved by the technology disclosed herein. The devices contemplated can be used in the field, for example, at ports-of-entry to a country, at checkpoints, or in law enforcement encounters. Replacement of conventional chemical ionization spectrometers with the device and materials disclosed herein would increase the field usability of such devices while not significantly impacting performance or other manufacturing aspects already optimized for such devices.

The introduction of the lantern structure for chemical dopant dispersion is additionally expected to be transferrable to other devices that make use of chemical ionization spectrometry or other chemical ionization analytical processes/systems. For example, the lantern structure for the dopant source would also be useful for certain mass spectrometers.

In an embodiment, the dopant source disclosed herein can be utilized without any heating element to elevate vapor pressure.

EXAMPLES

Example A

Chemical lantern dopant sources were constructed as shown as shown in FIG. 2. Multiple dopants were tested in a chemical lantern dopant source. Polyester wicks were used in each chemical lantern dopant source.

Figure 3:
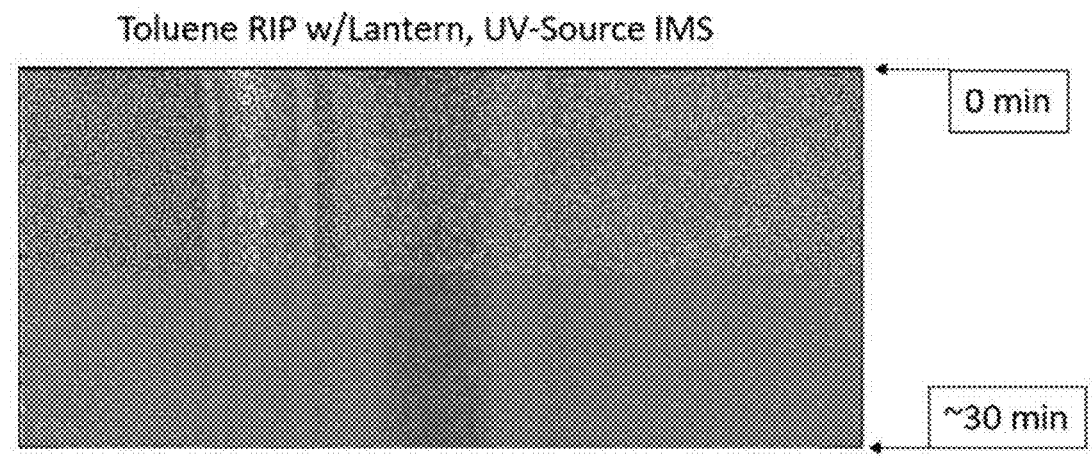
FIG. 3 is a reaction-ion-peak (RIP) spectra of exemplary embodiment of a dopant source.

FIG. 3 shows the RIP of a sample lantern dopant source incorporated into a UV-source mini-IMS, such as the one disclosed in FIG. 1. A red band was clearly visible indicating a colorimetric representation of voltage which is the signal coming from the IMS system.

A dopant (toluene) flow rate of 60 mL/min was held for ~30 min, resulting in a stable RIP indicating a consistent emission. This initial test was designed to run for the duration of a typical gas chromatography test.

Example B

Each of the dopant chemistries was loaded to their own chemical lantern as shown in FIG. 2 and weighted with a balance on a daily basis to measure emission through the wick. Controls were run in tandem; these did not include a punctured septum or wick. The controls verified the primary mode of emission/evaporation through the wick and not through the lantern lid/cap. Some dopants (e.g., toluene), had chemical incompatibility with the epoxy used for sealing the lid/cap and added to the emission process. A sealant that will be inert to toluene can be used, for example, a vinyl ester based epoxy.

Figure 4:
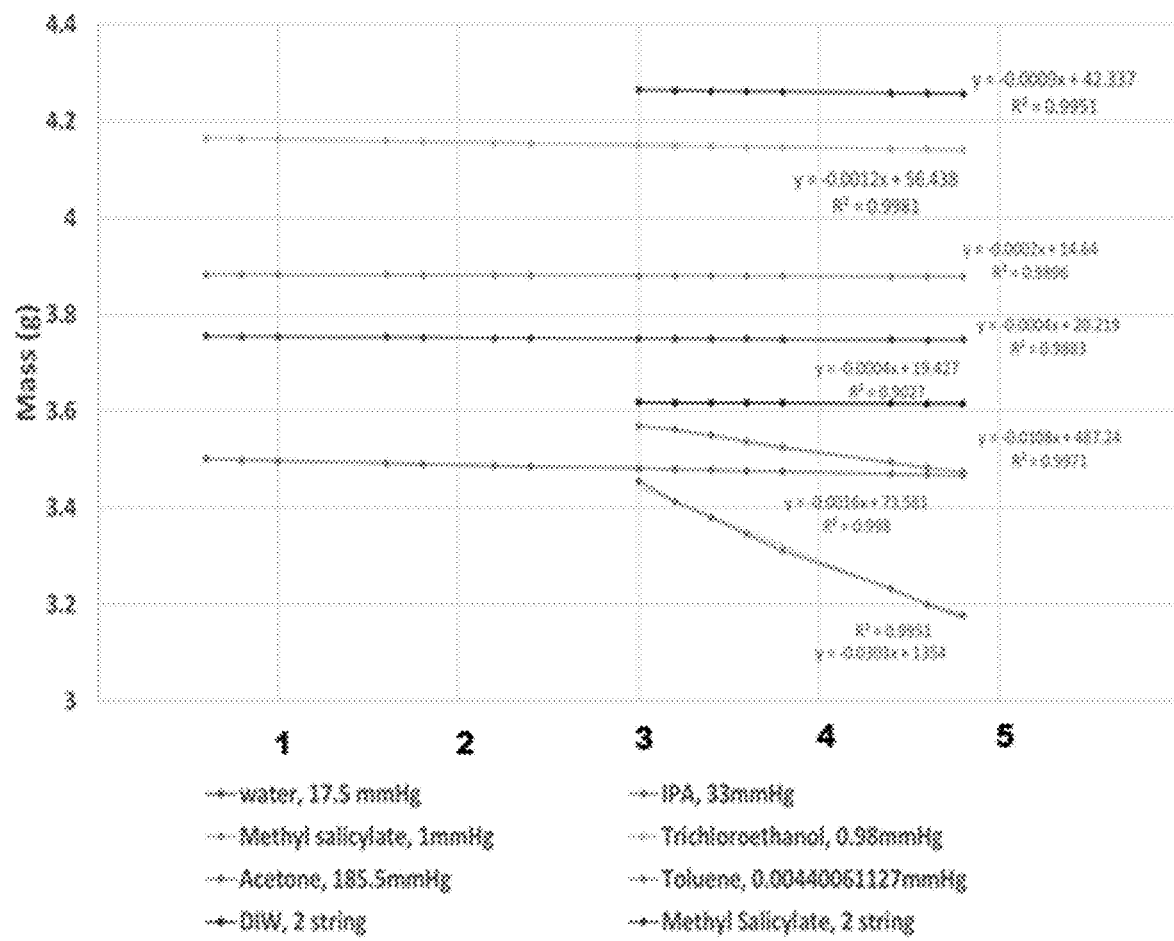
FIG. 4 is a graph showing the mass loss calculated over several days of the testing of the examples of lanterns shown in FIG. 2.

FIG. 4 is a graph showing the mass loss calculated over several days of the testing of the examples. R squared values for each of the dopants was above 98% for all single thread options over at least a week-long period when measured daily. R-squared values are shown in Table 1.

TABLE 1

| Dopant | $R^2$ |
|---|---|
| Water | 0.9883 |
| Methyl salicylate | 0.9896 |
| Acetone | 0.9951 |
| Deionized water, 2 wick | 0.9027 |
| IPA | 0.998 |
| Trichloroethanol | 0.9981 |
| Toluene | 0.9971 |
| Methyl Salicylate, 2 wick | 0.9951 |

Emission rate was controllable by changing the number of wicks. Table 2 shows the emission rates per day for each example.

TABLE 2

| Dopant | Emission Rate (mg/day) |
|---|---|
| Toluene | 10.8 |
| Trichloroethanol | 1.2 |
| Methyl Salicylate | 0.2 |
| Water | 0.4 |
| Isopropyl Alcohol | 1.6 |
| Acetone | 30.3 |

Table 3 shows how the emission rate changed with an added wick.

TABLE 3

| Dopant | Wicks | Emission Rate (mg/day) |
|---|---|---|
| Methyl Salicylate | 1 | 0.2 |
| Methyl Salicylate | 2 | 0.9 |

Example C

Figure 5:
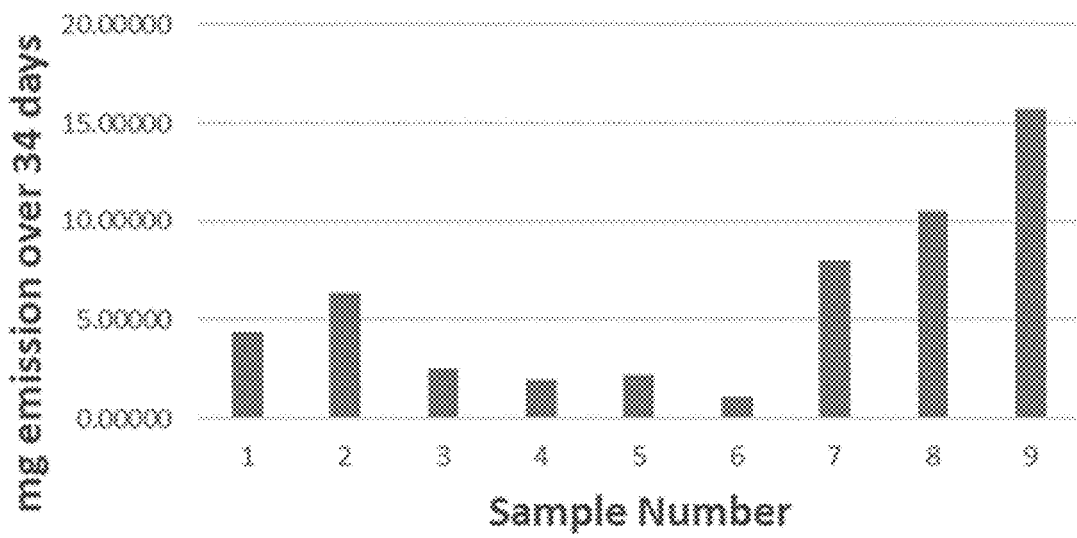
FIG. 5 is a graph showing the total emissions of water with controls over a 9 day time period in the lanterns shown in FIG. 2.

FIG. 5 is a graph showing the total emissions of dopant over a 9 day time period. Samples 1 and 2 listed here were 1 wick lantern dopant sources constructed as shown in FIG. 2.

Samples 3-6 were controls with the same dopant, but no wicks. More specifically, Sample 3 was a vial with a punctured septum and covered with epoxy sealant. Sample 4 was a vial with no septum punctured and no epoxy sealant. Sample 5 was a vial with a punctured septum, covered with epoxy sealant and with a metal wire inserted therein. Sample 6 was a vial with a punctured septum and covered with the epoxy sealant. Samples 7-9 were two-wick lanterns. All vials were the same size and form as shown in FIG. 2, and each were filled with the same amount of water.

Example D

Tests with different orientation (upright and side) of the lantern were conducted. Approximately equal emission rates were observed with both the side orientation and the upright orientation.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the" should be interpreted to mean "one or more" unless the context indicates the contrary.

It is claimed:

1. A device for dispersing a chemical dopant for chemical ionization, comprising:
   a vial containing a chemical dopant; and
   at least one wick with a first end extending outside the vial and a second end extending to contact the chemical dopant.

2. The device of claim 1, wherein the chemical dopant is selected from the group consisting of: methanol, isopropanol, acetone, acetonitrile, toluene, trichloroethanol, dichloromethane, dimethylformamide, dimethyl sulfoxide, tetrahydrofuran, ethanol, tricholoroethanol, methyl salicylate, water, and ethyl acetate.

3. The device of claim 1, wherein the chemical dopant is selected from the group consisting of: toluene, tricholoroethanol, methyl salicylate, water, isopropanol, and acetone.

4. The device of claim 1, wherein the vial is sealed with a cap and the wick extends through a septum in the cap.

5. The device of claim 4, wherein a layer of sealant is applied around the wick, sealing an interface between the wick and the septum.

6. The device of claim 1, wherein the at least one wick is a single wick.

7. The device of claim 1, wherein the at least one wick is multiple wicks.

8. The device of claim 1, wherein the wick is selected from the group consisting of: polyester, polymer, cotton, wood, fiberglass, Kevlar, silk, linen, jute, and sisal.

9. A chemical ionization system comprising:
   an ionization source; and
   a dopant source, the dopant source comprising:
   a vial; and
   at least one wick with a first end extending into the vial and a second end extending outside the vial.

10. The system of claim 9, wherein the chemical ionization system is an ion mobility spectrometer, and comprises:
    a drift tube coupled to the ionization source; and
    a detector coupled to the drift tube configured to detect ions passing through the drift tube.

11. The system of claim 9, wherein the dopant source is no more than 50 mm in its longest dimension.

12. The system of claim 9, wherein the wick extends through a septum associated with the vial.

13. The system of claim 12, wherein a layer of sealant is applied around the wick, sealing an interface between the wick and the septum.

14. The system of claim 9, wherein the ionization source is a UV radiation source.

15. The system of claim 9, wherein the system is operable in an upright or side orientation.

16. The system of claim 9, wherein the dopant source has a release rate with $R^2$ value of at least 0.95.

17. A method for doping a chemical ionization system, the method comprising:
   inserting a liquid dopant into a vial;
   diffusing the dopant into a ionization region of the system through at least one wick with a first end extending into the vial and a second end extending outside the vial; and
   doping a sample with the dopant.

18. The method of claim 17, wherein the vial is sealed with a cap and the wick extends through a septum in the cap.

19. The method of claim 18, wherein a layer of sealant is applied around the wick, sealing an interface between the wick and the septum.

20. The method of claim 17, wherein the dopant is selected from the group consisting of: methanol, isopropanol, acetone, acetonitrile, toluene, trichloroethanol, dichloromethane, dimethylformamide, dimethyl sulfoxide, tetrahydrofuran, ethanol, tricholoroethanol, methyl salicylate, water, and ethyl acetate.

\* \* \* \* \*